United States Patent

Kicks et al.

[15] 3,706,953
[45] Dec. 19, 1972

[54] PARTICLE IMPACT PROTECTORS AND ASSEMBLIES THEREOF FOR PRESSURE SENSING TRANSDUCERS HAVING DIAPHRAGMS

[72] Inventors: John C. Kicks; Howard P. Louth, both of Seattle, Wash.

[73] Assignee: Kulite Semiconductor Products, Ridgefield, N.J.

[22] Filed: May 7, 1970

[21] Appl. No.: 34,877

[52] U.S. Cl. ..........................338/4, 73/395, 73/406, 92/98
[51] Int. Cl. ................................................G01l 7/08
[58] Field of Search .........92/98; 73/395, 406; 338/4; 138/41, 42

[56] References Cited

UNITED STATES PATENTS

| | | | |
|---|---|---|---|
| 2,486,133 | 10/1949 | Egger | 73/395 |
| 3,422,679 | 1/1969 | McGowan et al. | 73/395 |
| 1,946,175 | 2/1934 | Murphy et al. | 73/406 X |
| 3,388,598 | 6/1968 | Hall | 73/395 X |
| 3,072,261 | 1/1963 | Smith | 138/42 |

Primary Examiner—Benjamin A. Borchelt
Assistant Examiner—R. Kinberg
Attorney—Roy E. Mattern, Jr.

[57] ABSTRACT

In wind tunnels and elsewhere whenever localized pressures, pressure fluctuations, pressure patterns, etc., are being monitored by pressure sensing transducers in which diaphrams are being used as the initial sensing elements, protectors are provided upstream to direct unwanted particles moving in the fluid streams to impact absorbing structures before reaching the diaphrams Such protectors in their assemblies are arranged in reference to the diaphragms so the directional changes of the fluid streams will not interfere with the accuracy of the observed and/or recorded pressures.

In a preferred embodiment of a protected pressure transducer having such a flexible diaphragm as the pressure sensing means, the diaphragm is mounted within a tubular housing which incorporates a protector plate fitted across the entire cross-sectional area of the tubular housing and it is formed with a plurality of holes near its circumference with all these holes being radially spaced beyond the circumference of the diaphragm to direct the fluid stream, possibly carrying particles, to energy absorbing structure located radially beyond the circumference of the diaphragm.

9 Claims, 4 Drawing Figures

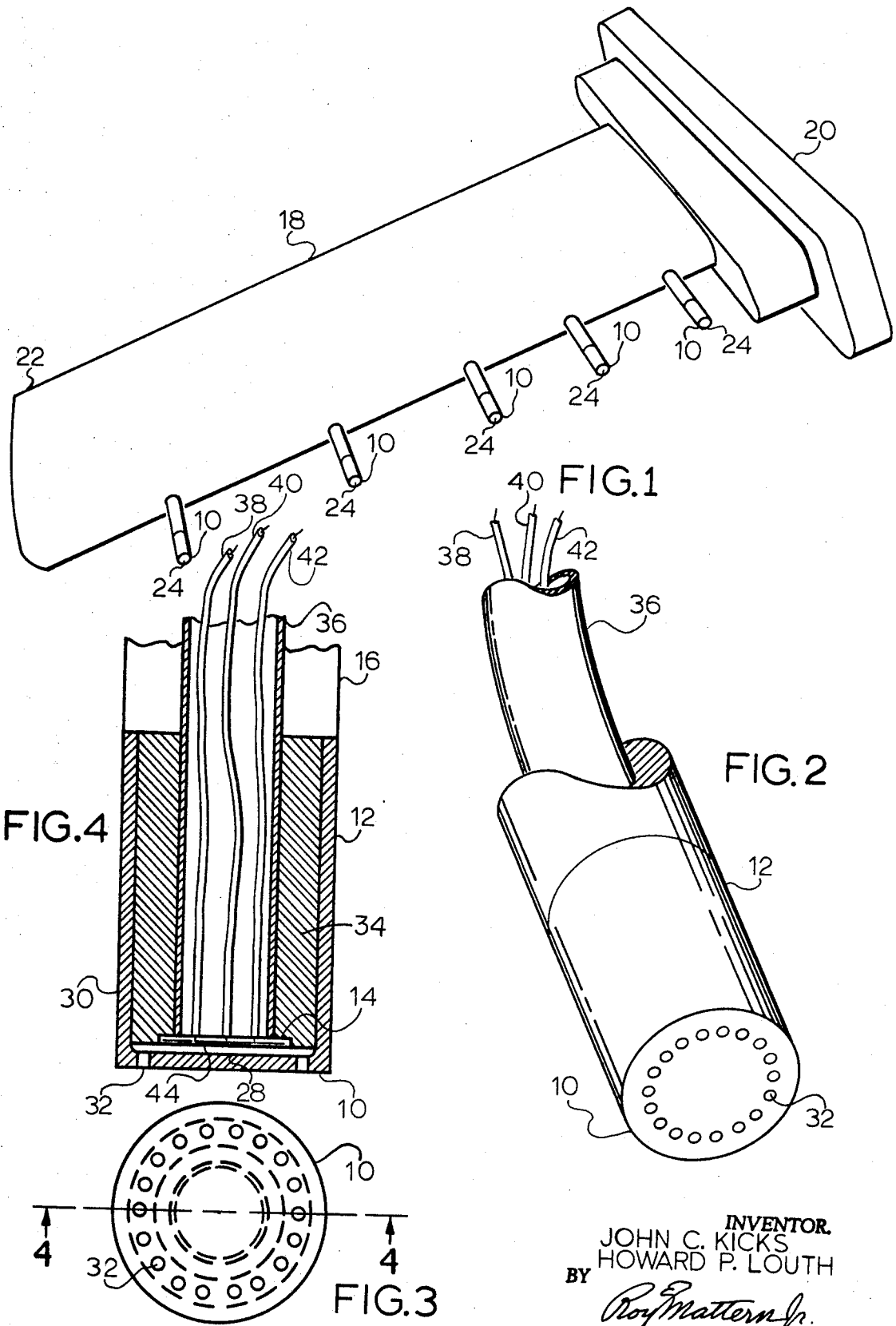

PARTICLE IMPACT PROTECTORS AND ASSEMBLIES THEREOF FOR PRESSURE SENSING TRANSDUCERS HAVING DIAPHRAGMS

BACKGROUND OF THE INVENTION

In all testing and monitoring of fluid status and/or movements there always is the need for reliable readings to be directly observed and/or recorded during the entire period of intended monitoring. The reliability of the pressure sensing transducers themselves under ideal conditions is often obtained only to be lost because of unwanted happenings attributable to operating environments.

In many different testing environments protective measures have been undertaken. In Walter L. Howland's U.S. Pat. No. 2,814,198, perforated discs support a diaphragm to prevent damage to the thin diaphragm by excessively high or excessively low pressures, encountered in aircraft flight testing. In Joseph P. Heagney's U.S. Pat. No. 2,178,422, a screen is disposed transversely across the entire open end of an air-speed indicator. However, the protection of pressure sensing diaphragms from direct onslaughts of minute and larger unwanted particles being carried by fluid streams remained a troublesome problem because direct in line impingement could still occur.

SUMMARY OF THE INVENTION

This invention, therefore, provides particle impact protectors and assemblies thereof for adaptation to and/or incorporation within overall pressure sensing transducer apparatus wherein the transducers have diaphragms which must continue to flex in response to pressure changes and therefore must be protected from damaging impingement of particles carried in the fluid streams being monitored. The protectors center on directing such particles into energy absorbing structures before they can possibly reach the diaphragms while traveling at speeds sufficient to cause damage upon impact with any of the diaphragms. In a preferred embodiment the particle impact protectors are structures arranged across each of the entire fluid streams going to the respective transducers and each of these structures has through passages positioned both upstream of and in line with particle impact absorbing structures, which in turn are positioned near the diaphragms but are separate therefrom, so any further movement of the particles will not cause any damage to the diaphragms.

DRAWINGS OF PREFERRED EMBODIMENTS

To illustrate the invention, it is shown as used in conjunction with pressure transducer instrumentation suitable for wind tunnel models, for example, of inlet engine sub-systems, where inside and outside pressure fluctuations are measured during wind tunnel test runs.

FIG. 1 is a perspective view of a probe adaptable for measuring the total impact at various radial locations in a fluid stream by using several pressure sensors having diaphragms protected from damaging impacts by particles carried in the fluid stream of a wind tunnel;

FIG. 2, is an enlarged perspective view of a pressure sensor transducer so protected and used singly or with others as shown in FIG. 1;

FIG. 3, is a front view with dotted lines indicating the respective radial spacing diameters of the passageways, energy absorbing structures and the flexible diaphragm; and FIG. 4 is a partial longitudinal full diameter section view of the pressure sensor transducer where the flexible diaphragm is protected from damage that might otherwise be caused by impinging particles being carried at high speeds by the fluid stream being monitored and/or observed.

DESCRIPTION OF PREFERRED EMBODIMENTS

The particle impact protectors 10 and assemblies 12 thereof are arranged as illustrated or in other ways and made in selected sizes and relative proportions with the objective of always protecting the flexible diaphragm 14 of the pressure sensing transducers 16. Such particle impact protectors 10 are particularly important in protecting the flexible diaphragms 14 of pressure transducers 16. Small and delicate transducers 16 are used in comparatively larger numbers to better record and observe fluid flow phenomenae as occurring for example, inside and outside of inlets of engines and engine sub-systems, and across airfoils, as parts and scaled down models are tested, for example, in wind tunnels.

During wind tunnel testing, it is extremely important that all pressure sensing transducers 16 remain unharmed by particles being carried by the wind tunnel air, so the transducers 16 will continue to sense pressure fluctuations throughout a test run. Not only must the readings be obtained the first time to avoid time delays, but also to avoid the duplication of wind tunnel rental costs for additional runs. Such rental costs in some wind tunnels are known to be established at $4,000.00 an hour.

Yet at all times, these diaphragm protection improvements are undertaken without interfering with the specified performance of the pressure transducers 16. The fluid flows being sensed, although directionally changed, cause the pressure transducers to convey test information which is accurately relied upon during the analysis of fluid flows passing by the parts and/or models undergoing the test in a wind tunnel.

Although the particle impact protectors 10 and assemblies thereof 12 have proven their value in wind tunnel tests, they are also used in flight tests. They are used wherever pressure sensing transducers 16 are being relied upon that have delicate internal components such as a flexible diaphragm 14 which must be protected. In the pressure transducers this flexible diaphragm 14 may be made of silicon or like frangible material, which if not protected, could fail because of the erosion of fracture by impact of particles being carried in the flowing wind tunnel air. Likewise, ductile materials would be protected from distortion or perforation if used as diaphragm material.

In FIG. 1, a grouping of particle impact protectors 10 and their assemblies 12 are illustrated in an embodiment described as an impact total probe 18 which is approximately 6 inches long. It is fitted to a part or to a model of a part not shown, at one end 20 and the other end 22 extends radially into the flow. When so orientated, as illustrated, each tube entry 24 will receive particles directly without deviation. Therefore these tubes 24 directing air to flexible sensing diaphragms 14 of pressure transducers 16 are equipped with particle impact protectors 10 shown in greater detail in FIGS. 2, 3 and 4.

Whether used in groups, or singly, each pressure transducer 16 is equipped with its particle impact protector 10. Errors, due to flow angularity, when compared to otherwise unprotected installations is minimal. The cavity 28, formed between the particle impact protector 10, the flexible diaphragm 14, the solid impact material 34, and further defined by the cylindrical housing 30 of the assembly thereof, has a natural frequency which is high compared to that of existing protective measures.

At all times the passageways or holes 32 in the particle impact protector 10 are radially spaced so the particles, not shown, passing through, do not impinge on the diaphragm 14. Instead they are directed into the interior of the steel case or cylindrical housing 30 of the transducer 16 where their energy is absorbed and damage to the flexible diaphragm 14 is thereby avoided.

Movement of flexible diaphragm 14 causes changes in its own strain gage 44. The electrical signal modifications created in this strain gage 44 are transmitted through wires 38, 40, and 42 positioned within tube 36. Eventually these transmission wires 38, 40, and 42 are connected to instruments, not shown, being observed by persons conducting tests.

SUMMARY OF ADVANTAGES

Wherever flexible diaphragms 14 are used in pressure sensing transducers 16 they may be protected from impingement caused by particles carried in the flowing fluids. Such protection is provided without interfering with the sensing capabilities of the transducers 16 within the frequency band specified. In all embodiments, any in line flow path to any portion of a flexible diaphragm 14 is blocked, yet flow in the overall general direction to reach the diaphragm 14, is not substantially altered while obtaining good pressure readings.

When pressure sensing transducers are so protected, their effective operating life is extended making them fully operable during the entire period of a test run. Therefore costly reruns or extended runs are avoided that might otherwise be necessary to resolve any doubts about what may be occurring with respect to fluid flows in, through and around models, parts of models, and parts per se in wind tunnels, and fluid flows in and around airplanes during flight tests, and any other fluid flows to be observed by using pressure sensing transducers having flexible diaphragms.

We claim:

1. Pressure sensing transducers having diaphragms protected from particle impact, comprising:
   a. a pressuring sensing transducer having a flexible diaphragm; said diaphragm of a given area,
   b. a particle impact protector assembly positioned before the pressure sensing transducer to protect its diaphragm, said particle impact protector having an area larger than said given area, with the larger extra outer area not in alignment with any area of said flexible diaphragm, said outer area having passageways positioned so particles going through and beyond the passageways are directionally restricted to strike the assembly and loose their energy without having the opportunity of severly impinging on the flexible diaphragm of the pressure sensing transducer.

2. Pressure sensing transducers having diaphragms protected from particle impact comprising:
   a. A pressure sensing transducer having a diaphragm of a given geometrical shape and,
   b. a particle impact protector of a larger geometrical shape and equipped with passageways not in alignment with any area of the diaphragm, said protector positioned before the pressure sensing transducer to protect its diaphragm, said passageways to direct the fluid flow without harmful particle impingement upon the diaphragm.

3. Pressure sensing transducers having diaphragms protected from particle impact, as claimed in claim 1 wherein the diaphragm is circular and the particle impact protector is larger in circular area.

4. A particle impact protector assembly adapted for placement ahead of a pressure sensing transducer which has a flexible diaphragm, comprising a housing, a particle impact protector secured at the entry of said housing and spaced to be eventually placed nearby a flexible diaphragm, said particle protector of greater area than any flexible diaphragm to be protected with its area extending beyond the flexible diaphragm area provided with passageways which are not alignable with any flexible portions of said diaphragm of any pressure sensing transducer to be so protected from particles carried in the fluid stream to thereby restrict the carried particles to a course that is clear of any direct impingement on said diaphragm.

5. A particle impact protector assembly, as claimed in claim 4, wherein the fluid passageways are circular.

6. A particle impact protector assembly as claimed in claim 4, wherein the fluid passageways are slots.

7. A pressure transducer of the type employing a flexible diaphragm positioned and supported within a longitudinal tubular member, said flexible diaphragm having at least one pressure responsive element coupled thereto, in combination therewith apparatus for protecting said diaphragm against particles present in a pressure transmitting environment, comprising
   a. a protector member of a diameter larger than the diameter of the flexible diaphragm and having a plurality of apertures located with respect to said tubular member such that when said protector member is placed in front of and in relative congruency with said diaphragm particles entering said apertures are directed to impinge mainly upon said tubular member.

8. In combination,
   a. a tubular housing having at least one opened end,
   b. a diaphragm coupled to said housing at said opened end, said diaphragm having a flexible portion defined by the area of said diaphragm encompassed within said open end of said housing, and a non-flexible portion for affording said coupling to said housing, and
   c. a protector plate coupled to said housing and positioned above said diaphragm, said protector plate having a plurality of apertures located about the periphery thereof, which periphery corresponds to said non-flexible portion of said diaphragm and aligned in a manner to direct a moving particle away from said flexible portion of said diaphragm and towards said housing.

9. In combination,
a. a longitudinal tubular member having a top open face,
b. a diaphragm substantially congruent with the cross section of said tubular member and mounted at said top open face with the portion of said diaphragm covering said open face permitted to flex, and
c. a protector plate mounted above said diaphragm and having a plurality of apertures about the periphery thereof each aligned to communicate with the sidewall of said tubular member which surrounds said top open face.

* * * * *